(12) United States Patent
Pickerill et al.

(10) Patent No.: US 8,829,736 B2
(45) Date of Patent: Sep. 9, 2014

(54) LOW-POWER START-UP AND DIRECTION CONTROL CIRCUITRY FOR AN IRRIGATION SYSTEM

(75) Inventors: Dan Pickerill, Milford, NE (US); Eric Risch, Omaha, NE (US)

(73) Assignee: Lindsay Corporation, Omaha, NE (US)

( * ) Notice: Subject to any disclaimer, the term of this patent is extended or adjusted under 35 U.S.C. 154(b) by 659 days.

(21) Appl. No.: 13/157,014

(22) Filed: Jun. 9, 2011

(65) Prior Publication Data

US 2011/0304222 A1 Dec. 15, 2011

Related U.S. Application Data

(60) Provisional application No. 61/353,012, filed on Jun. 9, 2010.

(51) Int. Cl.
*H02B 1/24* (2006.01)
*A01G 25/09* (2006.01)
(52) U.S. Cl.
CPC .................................. *A01G 25/092* (2013.01)
USPC ........................................................ 307/112
(58) Field of Classification Search
CPC ... A01G 25/09; A01G 25/092; A01G 25/095; A01G 25/097; A01G 25/00
USPC .................... 307/112, 113, 115, 116
See application file for complete search history.

(56) References Cited

U.S. PATENT DOCUMENTS

| | | | | |
|---|---|---|---|---|
| 3,604,005 A | * | 9/1971 | Gilmore | 180/315 |
| 3,750,953 A | * | 8/1973 | Reinke | 239/729 |
| 4,223,839 A | | 9/1980 | Bleakney | |
| 4,227,648 A | | 10/1980 | Holloway et al. | |
| 4,508,269 A | * | 4/1985 | Davis et al. | 239/729 |
| 4,580,731 A | | 4/1986 | Kegel et al. | |
| 4,662,563 A | * | 5/1987 | Wolfe, Jr. | 239/1 |
| 5,259,559 A | * | 11/1993 | Fitzgerald | 239/728 |
| 2008/0204856 A1 | * | 8/2008 | Malvino | 359/296 |

OTHER PUBLICATIONS

PCT International Search Report and Written Opinion from PCT Application No. PCT/US2012/025674 entitled Low Power Start-Up and Direction Control Circuitry for an Irrigation System (Dated Feb. 17, 2012).

* cited by examiner

*Primary Examiner* — Jared Fureman
*Assistant Examiner* — Joel Barnett
(74) *Attorney, Agent, or Firm* — Hovey Williams LLP

(57) ABSTRACT

An electric circuit for remotely starting and controlling the direction of a center pivot irrigation system comprises a first transformer, a second transformer, a first relay, a second relay, a third relay, and a fourth relay. The first transformer is coupled to a voltage source with a first voltage and may step the first voltage down to a second voltage. The second transformer is coupled to the first transformer, receiving a third voltage and stepping the third voltage up to a fourth voltage. The first relay may include contacts that are open when the irrigation system is started remotely. The second relay may include contacts that are closed when the irrigation system is started remotely. The third relay may include contacts that are closed momentarily to drive the system in a first direction. The fourth relay may include contacts that are closed momentarily to drive the system in a second direction.

20 Claims, 2 Drawing Sheets

LOW-POWER START-UP AND DIRECTION CONTROL CIRCUITRY FOR AN IRRIGATION SYSTEM

RELATED APPLICATIONS

Figure 1:
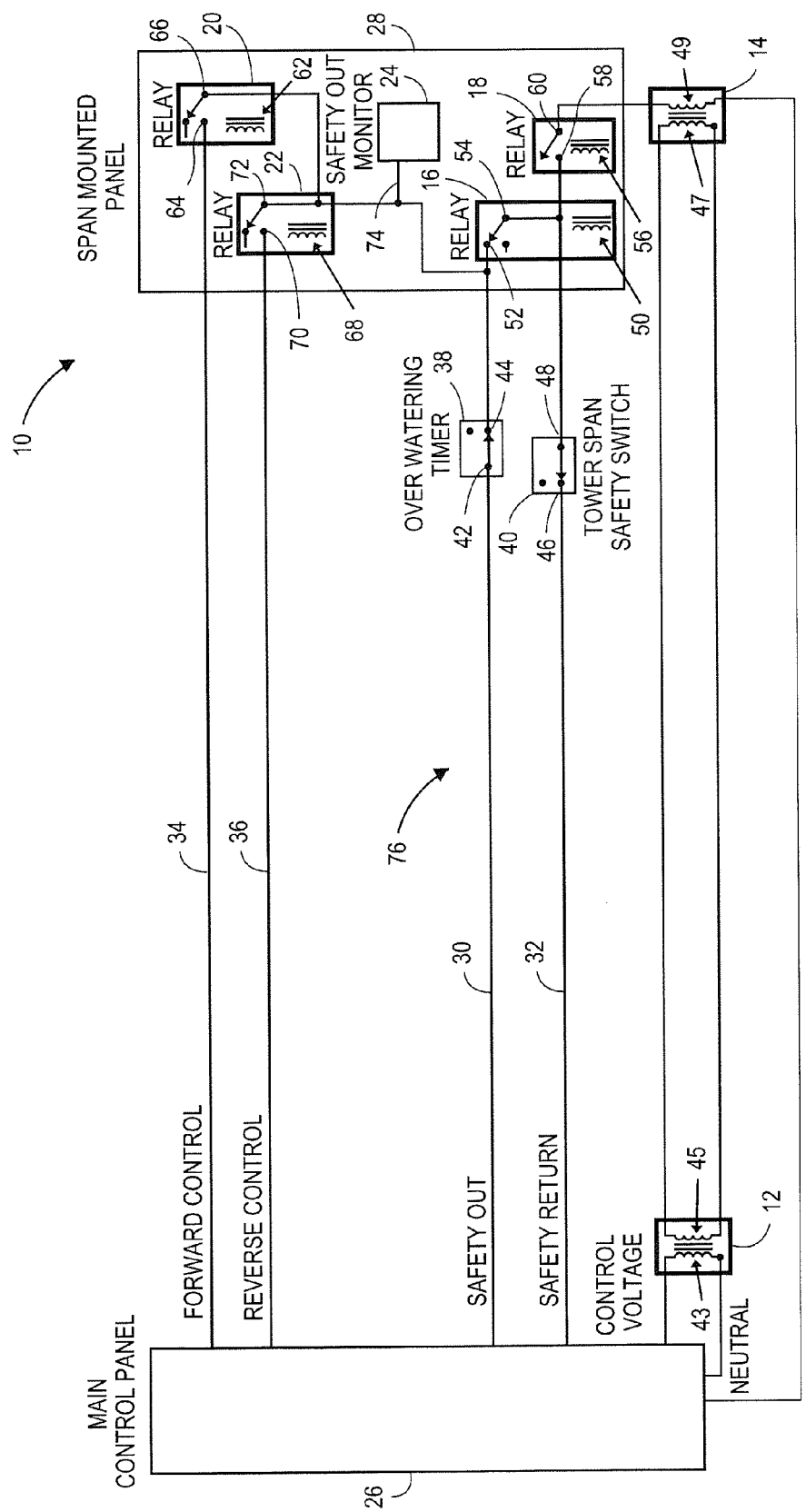

This non-provisional patent application claims priority benefit with regard to all common subject matter of the earlier filed U.S. Provisional Patent Application titled "LOW-POWER START-UP FOR IRRIGATION SYSTEM AND DIRECTION MONITOR AND CONTROL FOR IRRIGATION SYSTEM", Ser. No. 61/353,012, filed on Jun. 9, 2010, which is hereby incorporated by reference in its entirety into the present application.

BACKGROUND OF THE INVENTION

1. Field of the Invention

Embodiments of the present invention relate to electric circuitry for use with a center pivot irrigation system. More particularly, embodiments of the present invention relate to electric circuits for starting a center pivot irrigation system from a remote location.

2. Description of the Related Art

Center pivot irrigation systems are used for crop irrigation and generally include components that require electric power to operate. The systems may be started and stopped remotely by a user with a wireless device. The systems may include wiring for starting the system remotely that is energized at dangerous levels of voltage even when the irrigation system is not operating.

SUMMARY OF THE INVENTION

Embodiments of the present invention solve the above-mentioned problems and provide a distinct advance in the art of electric circuitry for use with a center pivot irrigation system. More particularly, embodiments of the invention provide electric circuits for starting and controlling the direction of a center pivot irrigation system from a remote location that include low power wiring that extends the length of the irrigation system.

One embodiment of the invention is an electric circuit for remotely starting and controlling the direction of a center pivot irrigation system and comprising a first transformer, a second transformer, a first relay, a second relay, a third relay, and a fourth relay. The first transformer may include a primary side coupled to a first voltage source with a first voltage and a secondary side presenting a second voltage. The first transformer may be configured to step the first voltage down to a lower second voltage. The second transformer may include a primary side coupled to the secondary side of the first transformer with a third voltage and a secondary side presenting a fourth voltage. The second transformer may be configured to step the third voltage up to a higher fourth voltage.

The first relay may include a first input, a first contact, and a second contact. The first input may change a connection between the first and second contacts, wherein the connection between the first and second contacts is open when the center pivot irrigation system is started remotely. The second relay may include a second input, a third contact connected to the second contact, and a fourth contact. The second input may change a connection between the third and fourth contacts, wherein the connection between the third and fourth contacts is closed when the center pivot irrigation system is started remotely. The fourth contact may be connected to the secondary side of the second transformer and may receive the fourth voltage. The first contact may be connected to a first cable that receives no voltage when the center pivot irrigation system is started remotely. The third contact may be connected to a second cable that receives the fourth voltage when the center pivot irrigation system is started remotely.

The third relay may include a third input, a fifth contact, and a sixth contact connected to the first contact. The third input may change a connection between the fifth and sixth contacts, wherein the connection between the fifth and sixth contacts is closed momentarily to drive the center pivot irrigation system in a first direction. The fourth relay may include a fourth input, a seventh contact, and an eighth contact connected to the first contact. The fourth input may change a connection between the seventh and eighth contacts, wherein the connection between the seventh and eighth contacts is closed momentarily to drive the center pivot irrigation system in a second direction.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Figure 2:
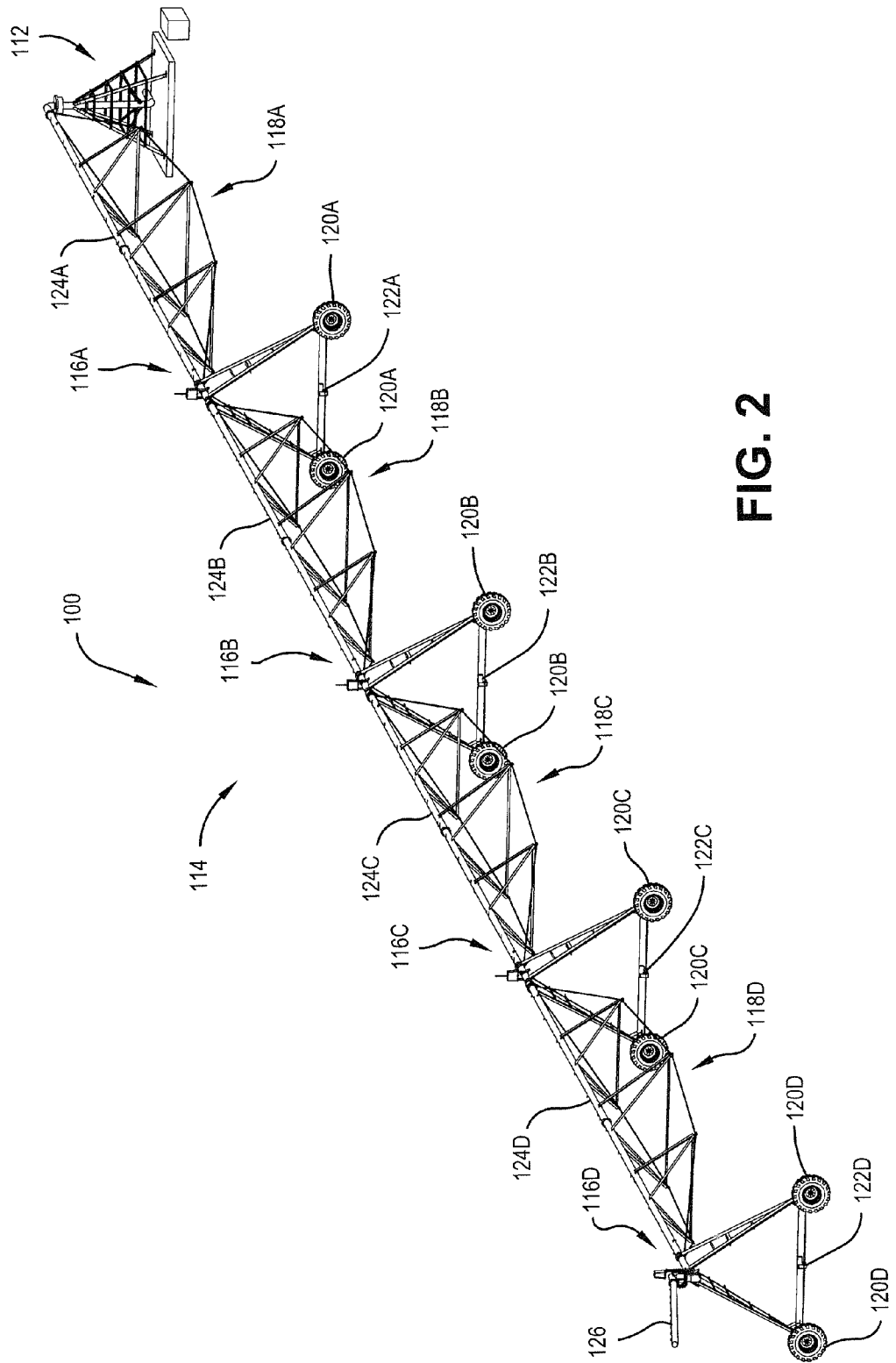

Embodiments of the present invention are described in detail below with reference to the attached drawing figures, wherein:

FIG. 1 is a block schematic diagram of an electric circuit for remotely starting and controlling the direction of a center pivot irrigation system, constructed in accordance with various embodiments of the current invention; and FIG. 2 is a perspective view of a central pivot irrigation system constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

An electric circuit 10 for remotely starting and controlling the direction of an irrigation system 100, constructed in accordance with a first embodiment of the present invention, is shown in FIG. 1 and broadly comprises a first transformer 12, a second transformer 14, a first relay 16, a second relay 18, a third relay 20, a fourth relay 22, and a monitor circuit 24.

Turning to FIG. 2, an exemplary irrigation system 100 on which principles of the present invention may be implemented is illustrated. An embodiment of the irrigation system 100 is a central pivot irrigation system and broadly comprises a fixed central pivot 112 and a main section 114 pivotally connected to the central pivot. The irrigation system 100 may also comprise an extension arm (also commonly referred to as a "swing arm" or "corner arm") pivotally connected to the free end of the main section.

The fixed central pivot 112 may be a tower 116 or any other support structure about which the main section 114 may pivot. The central pivot has access to a well, water tank, or other source of water and may also be coupled with a tank or other source of agricultural products to inject fertilizers, pesticides and/or other chemicals into the water for application during irrigation.

The main section 114 may comprise any number of mobile support towers 116A-D, the outermost 116D of which is referred to herein as an "end tower". The support towers are connected to the fixed central pivot 112 and to one another by truss sections 118A-D or other supports to form a number of interconnected spans.

The mobile towers have wheels 120A-D, at least one of which is driven by suitable drive motors 122A-D. Each motor 122A-D turns at least one of its wheels 120A-D through a drive shaft to move its mobile tower and thus the main section in a circle about the central pivot to irrigate a field. The motors 122A-D may include integral or external relays so they may be turned on, off, and reversed as described below. The motors may also have several speeds or be equipped with variable speed drives.

Although not required, some or all of the towers 116A-D may be equipped with steerable wheels pivoted about upright axes by suitable steering motors so that the towers can follow a predetermined track. U.S. Pat. No. 4,508,269 in the name of Davis et al. is hereby incorporated by reference in its entirety into the present specification for a disclosure of ground drive motors and steering motors associated with an irrigation machine. As is also well known, the drive motors for the towers are controlled by a suitable safety system such that they may be slowed or completely shut down in the event of the detection of an adverse circumstance, all of which is disclosed, for example, in U.S. Pat. No. 6,042,031 to Christensen, et al. incorporated herein by reference in its entirety.

Each of the truss sections 118A-D carries or otherwise supports a conduit section 124A-D or other fluid distribution mechanism that is connected in fluid communication with all other conduit sections. A plurality of sprinkler heads, spray guns, drop nozzles, or other fluid-emitting devices are spaced along the conduit sections 124A-D to apply water and/or other fluids to land underneath the irrigation system.

The irrigation system 100 may also include an optional extension arm (not shown) pivotally connected to the end tower and may be supported by a swing tower with steerable wheels driven by a motor. The extension arm may be joined to the end tower by an articulating pivot joint. The extension arm is folded in relative to the end tower when it is not irrigating a corner of a field and may be pivoted outwardly away from the end tower while irrigating the corners of a field.

The irrigation system 100 may also include one or more high pressure sprayers or end guns 126 mounted to the end tower 116D or to the end of the extension arm. The end guns are activated at the corners of a field or other designated areas to increase the amount of land that can be irrigated.

The irrigation system 100 illustrated in FIG. 2 has four mobile support towers; however, it may comprise any number of mobile support towers, truss sections, wheels, and drive motors without departing from the scope of the present invention.

The irrigation system 100 may also include a main control system for controlling movement of the mobile towers 116A-D and operation of the fluid-emitting devices in accordance with an irrigation design program. The main control system may include a processor or other computing device with inputs that receive positional information from one or more GPS receivers mounted to the end tower or elsewhere. The processor may alternatively receive position information from angle encoders mounted between the central pivot and a first span of the main section. The processor may also include outputs connected to relay-controlled valves connected to the water-emitting devices and relay-controlled electric motors connected to the drive wheels of the mobile towers.

The irrigation system 100 may also include other components with which the electric circuit 10 interacts to remotely start and control the direction of the system. The other components, shown in FIG. 1, may include a main control panel 26, a span mounted panel 28, a first line 30, a second line 32, a third line 34, a fourth line 36, a timer 38, and at least one safety switch 40.

The main control panel 26 may be an enclosed panel box that is typically mounted at or near the central pivot 112 and may include an electrical power source or at least access to an electric power source. The main control panel may further include the main control system discussed above. The electric power source may supply alternating current (AC) or direct current (DC) voltage, as is known in the art. An exemplary electric power source may supply approximately 120 volts (V) AC.

The span mounted panel 28 may be an enclosed panel box that is typically mounted at or near the tower 116D at the end of the span. The span mounted panel 28 may house the first relay 16, the second relay 18, the third relay 20, and the fourth relay. In various embodiments, the span mounted panel 28 may also house the timer 38 and the second transformer 14.

The first line 30, labeled "Safety Out" in FIG. 1, the second line 32, labeled "Safety Return", the third line 34, labeled "Forward Control", and the fourth line, labeled "Reverse Control", may each include an electric current carrying metallic conductor such as a wire or cable.

The timer 38 may include digital or analog electric circuitry or mechanical components that are capable of keeping track of time and indicating when a certain period has expired. The timer 38 may also be programmable either locally at the timer 38 or wirelessly from a remote location. Accordingly, the timer 38 may also include wireless radio frequency (RF) receiving circuitry. The timer 38 may further include an electrical first contact 42 and an electrical second contact 44, such that the connection between the contacts 42, 44 is either opened or closed at the end of the given time period. An exemplary timer 38 may be programmed for a certain period of irrigation or watering such that during the period of watering, the connection between the contacts 42, 44 is closed. At the end of the watering period, the connection between the contacts 42, 44 is opened. The timer 38 may be positioned in or near the span mounted panel 28.

The safety switch 40 may be mounted on a tower 116 and may include a first contact 46 and a second contact 48. The safety switch 40 may have electrical or mechanical components that either close the connection between the contacts 46, 48 or open the connection. An exemplary safety switch 40 may include monitors that monitor the safety conditions of the tower 116, such as whether the tower 116 is tilting or leaning. The safety switch 40 may be normally closed, but may open if any of the safety conditions is not met.

The first transformer 12 may include electrical transforming components as are known in the art, such as at least two inductively coupled coils with a certain winding ratio between the coils. The first transformer 12 may include a primary 43 side operating at a primary voltage and a secondary 45 side operating at a secondary voltage. If the primary voltage is greater than the secondary voltage, then the first transformer 12 is a step-down transformer. If the primary voltage is less than the secondary voltage, then the first transformer 12 is a step-up transformer. An exemplary first transformer 12 is a step-down transformer with a primary voltage of approximately 120 VAC and a secondary voltage of approximately 28 VAC. The first transformer 12 may be positioned in or near the main control panel 26.

The second transformer 14 may be similar to the first transformer 12 and may include a primary 47 and a secondary 49. The primary 47 of the second transformer 14 is electrically connected to the secondary 45 of the first transformer 12. The second transformer 14 ideally should be a mirror image of the first transformer 12, with a primary voltage to match the secondary voltage of the first transformer 12 and a secondary voltage to match the primary voltage of the first transformer 12. In actual implementation, the second transformer 14 may be located at a large distance (approximately 0.25 miles) from the first transformer 12 with wiring making the connection therebetween. There may be a voltage drop across the wires, such that the voltage at the primary 47 of the second transformer 14 is less than the voltage at the secondary 45 of the first transformer 12. Thus, in some embodiments, the second transformer 14 may have a different winding ratio from the first transformer 12 in order to account for the voltage drop across the connecting wires. An exemplary second transformer 14 may be a step-up transformer with a primary voltage of approximately 24 VAC and a secondary voltage of approximately 120 VAC. The second transformer 14 may be positioned in or near the span mounted panel 28.

The first relay 16 may include an input 50 and a first contact 52 and a second contact 54. In various embodiments, the relay may be an electromagnetic type with an input that includes a coil. The first relay 16 may operate in at least two modes. In the first mode, when the input 50 is not energized, the connection between the contacts 52, 54 is closed. When the input 50 is energized, the connection between the contacts 52, 54 is opened. In the second mode, when the input 50 is not energized, the connection between the contacts 52, 54 is open. When the input 50 is energized, the connection between the contacts 52, 54 is closed. An exemplary first relay 16 may include a wireless receiver circuit coupled to the input 50 such that the input 50 may be energized and de-energized remotely by a user, such as the owner or manager of the irrigation system 100. The user may send a first relay signal to the first relay 16 from an electronic device with wireless transmission capabilities such as a cell phone, a tablet computer, a laptop computer, a desktop computer, or the like. Thus, the user may control the operation of the first relay 16 by sending the first relay signal to either open the contacts 52, 54 or open the contacts 52, 54.

The second relay 18 may be substantially similar to the first relay 16 and may include an input 56 and a first contact 58 and a second contact 60. The input 56 of the second relay 18 may also be coupled to a wireless receiver circuit such that the input 56 may be energized and de-energized remotely by a user. Thus, the user may either open the contacts 58, 60 or close the contacts 58, 60 by transmitting a second relay signal remotely.

The third relay 20 may be substantially similar to the first relay 16 and may include an input 62 and a first contact 64 and a second contact 66. The input 62 of the third relay 20 may also be coupled to a wireless receiver circuit such that the input 62 may be energized and de-energized remotely by a user. Thus, the user may either open the contacts 64, 66 or close the contacts 64, 66 by transmitting a third relay signal remotely. In various embodiments, the contacts 64, 66 of the third relay 20 may be normally open and may close momentarily when the third relay signal is received.

The fourth relay 22 may be substantially similar to the first relay 16 and may include an input 68 and a first contact 70 and a second contact 72. The input 68 of the fourth relay 22 may also be coupled to a wireless receiver circuit such that the input 68 may be energized and de-energized remotely by a user. Thus, the user may either open the contacts 70, 72 or close the contacts 70, 72 by transmitting a fourth relay signal remotely. In various embodiments, the contacts 70, 72 of the fourth relay 22 may be normally open and may close momentarily when the fourth relay signal is received.

The monitor circuit 24 may include analog and or digital circuitry that can sense a voltage, determine the value of the voltage, and generate a ready signal if the value of the voltage is at or above a predetermined level. The monitor circuit 24 may also include wireless transmission circuitry to transmit the ready signal to a remote user.

Referring to FIG. 1, the irrigation system 100 may also include a safety loop 76 formed by the first line 30, the timer 38, the first relay 16, the safety switches 40, and the second line 32, described in more detail as follows. The first line 30 is connected to the main control panel 26 and the first and second contacts 42, 44 of the timer 38. The first line 30 is also connected to the first contact 52 of the first relay 16. The second contact 54 of the first relay 16 is connected to the second line 32, which in turn is connected to both contacts 46, 48 of the safety switch 40 and to the main control panel 26. In embodiments where there are a plurality of safety switches 40, the second line 32 is connected to both contacts 46, 48 of all the safety switches 40. The primary 43 of the first transformer 12 is connected to a control voltage from the main control panel 26. The secondary of the first transformer 12 is connected to the primary 47 of the second transformer 14. The secondary 49 of the second transformer 14 is connected to the second contact 60 of the second relay 18. The first contact 58 of the second relay 18 is connected to the second contact 54 of the first relay 16. As mentioned above, the inputs 50, 56 of the first relay 16 and the second relay 18 may be coupled to a wireless receiver such that the first relay 16 and the second relay 18 can be controlled remotely.

The first line 30 is also connected to the input 74 of the monitor circuit 24, the second contact 66 of the third relay 20 and the second contact 72 of the fourth relay 22. The first contact 64 of the third relay 20 is connected to the third line 34, which is also connected to the main control panel 26. The first contact 70 of the fourth relay 22 is connected to fourth line 36, which is also connected to the main control panel 26. As discussed above, the inputs 62, 68 of the third relay 20 and the fourth relay 22 may be coupled to a wireless receiver such that the third relay 20 and the fourth relay 22 can be controlled remotely.

The irrigation system 100 may be started either locally or remotely. To start the system locally, a user generally pushes a button (not shown in FIG. 1) that supplies electric power to the irrigation components. While the button is pushed, the safety loop is bypassed and is not active. Once the system is operating, the button is released. Alternatively, the button may be released after a certain time period. When the button is released, a first voltage is applied to the first line 30 at the main control panel 26. Typically, the first voltage is approximately 120 VAC. Under normal irrigation conditions, the contacts 42, 44 of the timer 38 are closed, the contacts 52, 54 of the first relay 16 are closed, the contacts 58, 60 of the second relay 18 are open, and the contacts 46, 48 of the safety switches 40 are closed. The safety loop 76 is closed. Thus, the first voltage is present on the second line 32 at the main control panel 26, which allows electrical power to continue to be delivered to the irrigation components requiring power.

A user may wish to halt watering and may send the first relay signal to the first relay 16 to open the contacts 52, 54. The opening of the contacts 52, 54 breaks the safety loop 76 and the irrigation components requiring electric power cease to receive the power and the irrigation system 100 stops. The system may also be restarted by the user remotely.

To start the irrigation system 100 remotely, a remote start process may be followed such that the contacts 52, 54 of the first relay 16 are opened, and the contacts 58, 60 of the second relay 18 are closed. At the main control panel 26, a second voltage (the control voltage) is applied to the primary 43 of the first transformer 12. An exemplary second voltage is approximately 120 VAC. A third voltage is present on the secondary 45 of the first transformer 12. Due to the parameters of the windings of the first transformer 12, the third voltage is approximately 28 VAC. A fourth voltage is present on the primary 47 of the second transformer 14. If the second transformer 14 is located close to the first transformer 12 and the cables between the two are short, then the fourth voltage may be approximately the same as the third voltage. However, typically, the first transformer 12 is at the central pivot 112 and the second transformer 14 is at the last tower 116D of the irrigation span. Thus, the cables are long and as a result, the fourth voltage is less than the third voltage due to the voltage drop of the cables. An exemplary fourth voltage is approximately 24 VAC. A fifth voltage is present on the secondary 49 of the second transformer 14. Due to the parameters of the windings of the second transformer 14, the fifth voltage is approximately 120 VAC. Therefore, by design, the fifth voltage is approximately the same as the second voltage or the control voltage from the main control panel 26. The fifth voltage is applied to the second relay 18 and in turn, to the second line 32. Applying a voltage, such as the control voltage, to the second line 32 provides electric power to the irrigation system 100, which then starts the process of irrigation. When the system starts, the contacts 52, 54 of the first relay 16 are closed and the contacts 58, 60 of the second relay 18 are opened. During the beginning of the remote start process, the contacts 52, 54 of the first relay 16 are opened in order to avoid putting a voltage on the first line 30, which is connected to the main control panel 26 and might draw more current than the second transformer 14 can supply.

In various embodiments, the remote start process may be automated, such that the first relay signal is sent to the first relay 16 to open the contacts 52, 54. The second relay signal is sent to the second relay 18 to close the contacts 58, 60. After a period of time has passed to allow the irrigation system 100 components to start, the first signal is sent to the first relay 16 to close the contacts 52, 54, and the second relay signal is sent to the second relay 18 to open the contacts 58, 60.

Once the irrigation system 100 is started, the direction of travel for the span may be selected. Forward may be considered counterclockwise when the irrigation system 100 is viewed from above. Reverse may be considered clockwise when viewed from above. The monitor circuit 24 monitors the voltage of the first line 30 and generates the ready signal when the voltage is at or above a certain level. Typically, that level is approximately 120 VAC. When the ready signal is received by the user, the direction of travel may be selected by sending the third relay signal to the third relay 20 for the forward direction or the fourth relay signal to the fourth relay 22 for the reverse direction. When the third relay signal is received by the third relay 20, the contacts 64, 66 may close momentarily to send a forward signal to the components that determine the direction of the irrigation system 100. When the fourth relay signal is received by the fourth relay 22, the contacts 70, 72 may close momentarily to send a reverse signal to the components that determine the direction of the irrigation system 100.

In various embodiments, the monitor circuit 24 may be optional. In such embodiments, the user or an automated processing system may wait a short period of time, perhaps a few seconds, after the irrigation system 100 starts before sending either the third relay signal or the fourth relay signal.

The circuit 10 of the present invention provides the ability for a irrigation system 100 to be started and have the direction chosen remotely, while also providing cables that extend the length of the irrigation span which are powered at a lower and safer voltage than the control voltage from the main control panel 26. The first transformer 12, positioned near the central pivot 112, steps the control voltage down to a safer value (approximately 28 VAC, for example), and the second transformer 14, positioned near the end of the span, steps the voltage up to the control voltage level. The control voltage (approximately 120 VAC) is required at the span mounted panel 28 for starting the irrigation system 100 when the system is off. However, having cables along the span that are energized with a voltage might be unexpected when the irrigation system 100 is not running. Therefore, this setup provides a safer environment for a technician, or the like, to work since the voltage applied to the cables is at a safer value.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters patent includes the following:

1. An electric circuit for remotely starting a center pivot irrigation system including a central pivot and a plurality of towers, the electric circuit comprising:
   a control panel positioned proximal to the central pivot and including access to an electric power source;
   a first cable connected to the control panel;
   a second cable connected to the control panel;
   a first transformer positioned proximal to the control panel and including a primary side coupled to a first voltage source with a first voltage and a secondary side presenting a second voltage, the first transformer configured such that the first voltage is greater than the second voltage;

a second transformer positioned proximal to an outermost tower and including a primary side coupled to the secondary side of the first transformer with a third voltage and a secondary side presenting a fourth voltage, the second transformer configured such that the third voltage is less than the fourth voltage;

a first relay positioned proximal to the outermost tower and including a first input, a first contact connected to the first cable, and a second contact connected to the second cable, the first input operable to change a connection between the first and second contacts; and a second relay positioned proximal to the outermost tower and including a second input, a third contact connected to the second contact, and a fourth contact, the second input operable to change a connection between the third and fourth contacts, wherein, when the center pivot irrigation system is started remotely, the connection between the first and second contacts is momentarily open, the connection between the third and fourth contacts is momentarily closed, and a circuit is formed with a conductive path that includes the secondary side of the second transformer and the second cable.

2. The electric circuit of claim 1, wherein the fourth contact is connected to the secondary side of the second transformer and receives the fourth voltage.

3. The electric circuit of claim 2, wherein the first cable receives no voltage when the center pivot irrigation system is started remotely.

4. The electric circuit of claim 2, wherein the second cable that receives the fourth voltage when the center pivot irrigation system is started remotely.

5. The electric circuit of claim 1, wherein the connection between the first and second contacts is closed when the center pivot irrigation system is irrigating.

6. The electric circuit of claim 1, wherein the connection between the third and fourth contacts is open when the center pivot irrigation system is irrigating.

7. The electric circuit of claim 1, wherein the first input is further operable to receive a remote wireless signal to change the connection between the first and second contacts.

8. The electric circuit of claim 1, wherein the second input is further operable to receive a remote wireless signal to change the connection between the third and fourth contacts.

9. The electric circuit of claim 1, wherein the first voltage is approximately 120 Volts AC, the second voltage is approximately 28 Volts AC, the third voltage is approximately 24 Volts AC, and the fourth voltage is approximately 120 Volts AC.

10. An electric circuit for remotely starting and controlling the direction of a center pivot irrigation system, the system including a central pivot and a plurality of towers, the electric circuit comprising:

a control panel positioned proximal to the central pivot and including access to an electric power source;

a first cable connected to the control panel;

a second cable connected to the control panel;

a first transformer positioned proximal to the control panel and including a primary side coupled to a first voltage source with a first voltage and a secondary side presenting a second voltage, the first transformer configured such that the first voltage is greater than the second voltage;

a second transformer positioned proximal to an outermost tower and including a primary side coupled to the secondary side of the first transformer with a third voltage and a secondary side presenting a fourth voltage, the second transformer configured such that the third voltage is less than the fourth voltage;

a first relay positioned proximal to the outermost tower and including a first input, a first contact connected to the first cable, and a second contact connected to the second cable, the first input operable to change a connection between the first and second contacts;

a second relay positioned proximal to the outermost tower and including a second input, a third contact connected to the second contact, and a fourth contact, the second input operable to change a connection between the third and fourth contacts, wherein, when the center pivot irrigation system is started remotely, the connection between the first and second contacts is momentarily open, the connection between the third and fourth contacts is momentarily closed, and a circuit is formed with a conductive path that includes the secondary side of the second transformer and the second cable;

a third relay including a third input, a fifth contact, and a sixth contact connected to the first contact, the third input operable to change a connection between the fifth and sixth contacts, wherein the connection between the fifth and sixth contacts is closed momentarily to drive the center pivot irrigation system in a first direction; and a fourth relay including a fourth input, a seventh contact, and an eighth contact connected to the first contact, the fourth input operable to change a connection between the seventh and eighth contacts, wherein the connection between the seventh and eighth contacts is closed momentarily to drive the center pivot irrigation system in a second direction.

11. The electric circuit of claim 10, wherein the first cable presents a fifth voltage and the fifth contact receives the fifth voltage when the connection between the fifth and sixth contacts is closed momentarily.

12. The electric circuit of claim 10, wherein the first cable presents a fifth voltage and the seventh contact receives the fifth voltage when the connection between the seventh and eighth contacts is closed momentarily.

13. The electric circuit of claim 10, wherein the fourth contact is connected to the secondary side of the second transformer and receives the fourth voltage.

14. The electric circuit of claim 13, wherein the first cable receives no voltage when the center pivot irrigation system is started remotely.

15. The electric circuit of claim 13, wherein the second cable receives the fourth voltage when the center pivot irrigation system is started remotely.

16. The electric circuit of claim 10, wherein the connection between the first and second contacts is closed and the connection between the third and fourth contacts is open when the center pivot irrigation system is irrigating.

17. The electric circuit of claim 10, wherein the first input is further operable to receive a remote wireless signal to change the connection between the first and second contacts.

18. The electric circuit of claim 10, wherein the second input is further operable to receive a remote wireless signal to change the connection between the third and fourth contacts.

19. The electric circuit of claim 10, wherein the third input is further operable to receive a remote wireless signal to change the connection between the fifth and sixth contacts.

20. The electric circuit of claim 10, wherein the fourth input is further operable to receive a remote wireless signal to change the connection between the seventh and eighth contacts.

* * * * *